UNITED STATES PATENT OFFICE.

EMILE F. LOISEAU, OF PHILADELPHIA, PENNSYLVANIA.

IMPROVEMENT IN COMPOSITIONS FOR ARTIFICIAL FUEL.

Specification forming part of Letters Patent No. 167,914, dated September 21, 1875; application filed August 21, 1875.

*To all whom it may concern:*

Be it known that I, EMILE F. LOISEAU, of Philadelphia, in the county of Philadelphia and State of Pennsylvania, have invented a new and Improved Composition for the Manufacture of Artificial Fuel, of which the following is a specification:

My invention has for its object the utilization of the waste of coal-mines, coal-yards, &c., and the production of an article to be used as fuel and as a substitute for ordinary coal, that can be supplied cheaper, will last longer, give a more regular heat, and produce no smoke or odor while burning. It can be prepared for use in any kind of heating apparatus with great rapidity, and may be handled and transported with facility.

The composition consists of coal-waste, pulverized clay, and a diluted paste of rye and lime, which ingredients are mixed and prepared in about the following manner and proportions: Coal-waste, ninety-five parts; pulverized clay, five parts; and one gallon of diluted rye and lime paste to every hundred pounds of coal and clay.

The rye and lime paste is prepared in the following manner: Ninety-eight pounds of rye flour, one pound of alum, and one pound of turpentine are placed in a large vessel and stirred by a central revolving-shaft with stirrers or paddles, under gradual addition of two hundred gallons of milk of lime until the flour is well diluted. Steam is then slowly introduced into the mixture until the paste is formed, cold water being then added under continual stirring in sufficient quantity to bring the paste to a state of liquefaction. One gallon of this liquid rye-lime paste is thoroughly mixed with the coal-waste and clay, and the composition is then ready to be molded into any required shape by appropriate machinery.

I do not intend to limit myself to the exact proportions herein specified, as they may be varied in some degree and yield equally good results, but various experiments have shown that satisfactory results are obtained with the proportions specified.

Having thus described my invention, I claim as new and desire to secure by Letters Patent—

A composition for artificial fuel, consisting of coal-waste, pulverized clay, and diluted rye and lime paste, in about the proportions set forth.

EMILE F. LOISEAU.

Witnesses:
H. L. PERRET,
DANIEL LIECHTY.